United States Patent
Zula et al.

(10) Patent No.: US 11,262,375 B2
(45) Date of Patent: Mar. 1, 2022

(54) SYSTEM AND METHOD FOR DETERMINING THE SPEED AND DIRECTION OF ROTATION OF A VEHICLE WHEEL

(71) Applicant: Bendix Commercial Vehicle Systems LLC, Elyria, OH (US)

(72) Inventors: Daniel P. Zula, North Ridgeville, OH (US); Nianqing Zhou, Avon, OH (US); Timothy J. Frashure, Columbia Station, OH (US); Claus G. Beyer, Celveland, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 132 days.

(21) Appl. No.: 16/711,499

(22) Filed: Dec. 12, 2019

(65) Prior Publication Data

US 2021/0181228 A1   Jun. 17, 2021

(51) Int. Cl.
*G01P 3/44* (2006.01)
*B60B 27/00* (2006.01)

(52) U.S. Cl.
CPC ............ *G01P 3/44* (2013.01); *B60B 27/0068* (2013.01)

(58) Field of Classification Search
CPC ....................................................... G01P 3/44
USPC ............................................................ 73/493
See application file for complete search history.

(56) References Cited

U.S. PATENT DOCUMENTS

| 4,947,116 | A  | * | 8/1990  | Welcome ................ G01P 3/488 |
|           |    |   |         | 324/161                             |
| 6,498,474 | B1 | * | 12/2002 | Turner ................... G01D 5/145 |
|           |    |   |         | 324/165                             |
| 9,110,091 | B2 |   | 8/2015  | Kopper et al.                       |
| 9,457,775 | B2 |   | 10/2016 | Goers et al.                        |
| 9,605,975 | B2 |   | 3/2017  | Foletto et al.                      |
| 9,827,958 | B2 |   | 11/2017 | Dalisdas et al.                     |
| 2010/0318255 | A1 | * | 12/2010 | Li .......................... G01P 13/04 |
|           |    |   |         | 701/31.4                            |
| 2020/0325983 | A1 | * | 10/2020 | Shariatmadar .......... F16H 59/42  |

\* cited by examiner

*Primary Examiner* — Walter L Lindsay, Jr.
*Assistant Examiner* — Philipmarcus T Fadul
(74) *Attorney, Agent, or Firm* — Reising Ethington P.C.

(57) ABSTRACT

A system and method for determining the speed and direction of rotation of a wheel in a vehicle are provided. The system includes a tone wheel configured for rotation with the vehicle wheel and a wheel speed sensor facing the tone wheel. The sensor generates different pluralities of phase-shifted signals responsive to rotation of the tone wheel depending on the direction of rotation of the vehicle wheel. A controller receives one of the pluralities of phase-shifted signals from the sensor, receives a direction signal indicative of the direction of rotation of the vehicle wheel from a source other than the sensor, and associates the plurality of phase-shifted signals with the direction of rotation of the vehicle wheel indicated by the direction signal in a memory.

22 Claims, 3 Drawing Sheets

SYSTEM AND METHOD FOR DETERMINING THE SPEED AND DIRECTION OF ROTATION OF A VEHICLE WHEEL

BACKGROUND OF THE INVENTION a. Field of the Invention

This invention relates to a system and method for determining the speed and direction of rotation of a vehicle wheel. In particular, the invention relates to a system and method that learn how to interpret the output of a wheel speed sensor in order to determine the direction of rotation of the vehicle wheel using information independent of the sensor and without the use of a physical key.

b. Background Art

Conventional vehicles monitor the speed and direction of travel of the vehicle for a variety of purposes including control of vehicle braking and vehicle stability. These vehicles frequently employ wheel speed sensors proximate some or all of the vehicle wheels to monitor the speed and direction of rotation of the wheels and provide this information to brake control systems, stability control systems and other vehicle systems. Each sensor is mounted in a rotationally fixed position opposite a tone wheel that is mounted to, and rotates with, a corresponding vehicle wheel. The wheel speed sensors may be passive sensors in which rotation of the tone wheel induces an alternating current in the sensor or active sensors in which rotation of the tone wheel modulates a pre-existing current in the sensor. Passive sensors have a low signal to noise output at low speeds because the slow rotation of the tone wheel does not induce a sufficiently strong current. Passive sensors are also unable to provide information regarding the direction of rotation. For these reasons, active sensors are often preferred in modern vehicles with advanced braking and stability control systems. Vehicles that use active wheel speed sensors, however, often require a physical key, such as a bolt, to precisely align the sensor with the vehicle wheel to allow the system to determine the direction of rotation based on signals output by the sensor. The use of a physical key requires a different mounting structure within the vehicle for active wheel speed sensors as compared to passive wheel speed sensors thereby preventing easy substitution of the sensors on a vehicle. Further, the use of a physical key is not possible in many commercial or heavy vehicles.

The inventors herein have recognized a need for a system and method for determining the speed and direction of rotation of a vehicle wheel that will minimize and/or eliminate one or more of the above-identified deficiencies.

BRIEF SUMMARY OF THE INVENTION

This invention relates to a system and method for determining the speed and direction of rotation of a vehicle wheel. In particular, the invention relates to a system and method that learn how to interpret the output of a wheel speed sensor in order to determine the direction of rotation of the vehicle wheel using information independent of the sensor and without the use of a physical key.

A system for determining the speed and direction of rotation of a vehicle wheel in accordance with one embodiment includes a wheel speed sensor facing a tone wheel configured for rotation with the vehicle wheel. The wheel speed sensor is configured to generate a first plurality of phase-shifted signals responsive to rotation of the tone wheel with the vehicle wheel in a first rotational direction and a second plurality of phase-shifted signals, different from the first plurality of phase-shifted signals, responsive to rotation of the tone wheel with the vehicle wheel in a second rotational direction. The system further includes a controller configured to receive one of the first and second pluralities of phase-shifted signals from the wheel speed sensor. The controller is further configured to receive a direction signal indicative of a current direction of rotation of the vehicle wheel from a source other than the wheel speed sensor. In certain embodiments, the direction signal may be generated by a vehicle component or system such as a yaw rate sensor, or transmission controller. In another embodiment, the direction signal may be generated by a user input (e.g., during end of line testing). The controller is further configured to associate the one of the first and second pluralities of phase-shifted signals with the current direction of rotation of the vehicle wheel indicated by the direction signal in a memory.

A method for determining the speed and direction of rotation of a vehicle wheel in accordance with one embodiment includes the step of receiving, from a wheel speed sensor facing a tone wheel configured for rotation with the vehicle wheel, one of a first plurality of phase-shifted signals generated by the wheel speed sensor responsive to rotation of the tone wheel with the vehicle wheel in a first rotational direction and a second plurality of phase-shifted signals, different from the first plurality of phase-shifted signals, generated by the wheel speed sensor responsive to rotation of the tone wheel with the vehicle wheel in a second rotational direction. The method may further include the step of receiving a direction signal indicative of a current direction of rotation of the vehicle wheel from a source other than the wheel speed sensor. In certain embodiments, the direction signal may be generated by a vehicle component or system such as a yaw rate sensor, or transmission controller. In another embodiment, the direction signal may be generated by a user input (e.g., during end of line testing). The method further includes the step of associating the one of the first and second pluralities of phase-shifted signals with the current direction of rotation of the vehicle wheel indicated by the direction signal in a memory.

A system and method for determining the speed and direction of rotation of a vehicle wheel in accordance with present teachings represents an improvement as compared to conventional systems and methods. In particular, the system and method use information independent of the wheel speed sensors to associate a direction of rotation with signals generated by the sensors. As a result, the system and method enable a direction of rotation to be associated with signals generated by passive or active wheel speed sensors. In the case of passive sensors, the system and method provide directional information where such information was not previously available. In the case of active sensors, the system and method provide directional information without requiring a physical key, thereby allowing the use of the same mounting structure in vehicles for both passive and active sensors.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
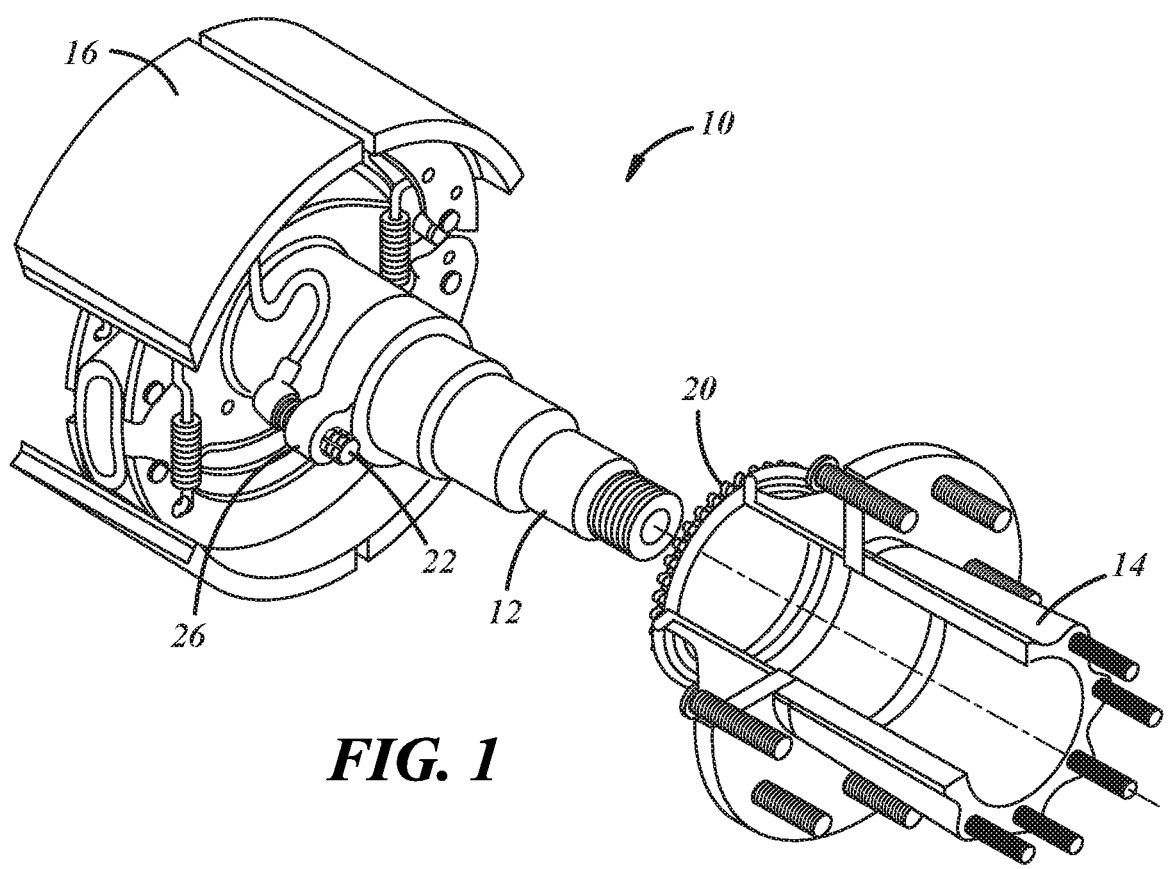
FIG. 1 is a perspective view of a vehicle wheel assembly including several elements of a system for determining the speed and direction of rotation of a vehicle wheel in accordance with one embodiment of the present teachings.

Referring now to the drawings wherein like reference numerals are used to identify identical components in the various views, FIG. 1 illustrates a wheel assembly 10 for a vehicle. In certain embodiments, the vehicle may comprise a heavy commercial vehicle and, in particular, a tractor-trailer (also referred to as a semi) containing a tractor or power unit and one or more trailers or towed units. It should be understood, however, that the inventions disclosed herein may find application in other types of commercial vehicles and in non-commercial vehicles. Assembly 10 includes an axle 12 and a wheel hub 14 that supports a vehicle wheel (not shown). The wheel hub 14 is rotatably supported on axle 12 by wheel bearings (not shown). Assembly 10 may further include a wheel brake 16 configured to apply a braking force to the vehicle wheel. In the illustrated embodiment, brake 16 comprises a drum brake in which a brake actuator causes, responsive to fluid pressure or another force, movement of one or more brake shoes into engagement with a braking surface in a brake drum (not shown) rotating with the vehicle wheel. Alternatively, brake 16 may comprise a disc brake in which a carrier supports brake pads on opposite sides of a rotor rotating with the vehicle wheel and a brake actuator causes, responsive to fluid pressure or another force, movement of a caliper relative to the carrier to move the brake pads into and out of engagement with the rotor. The operation of wheel brake 16 may be controlled by a brake control system (not shown) including a brake actuator, one or more fluid control valves that control the delivery of fluid pressure to the brake actuator and a controller that generates control signals to controls the operation of the fluid control valves in response to various inputs including signals from sensors indicative of the operation of the vehicle and surrounding environment and from user inputs by the vehicle operator.

Figure 2:
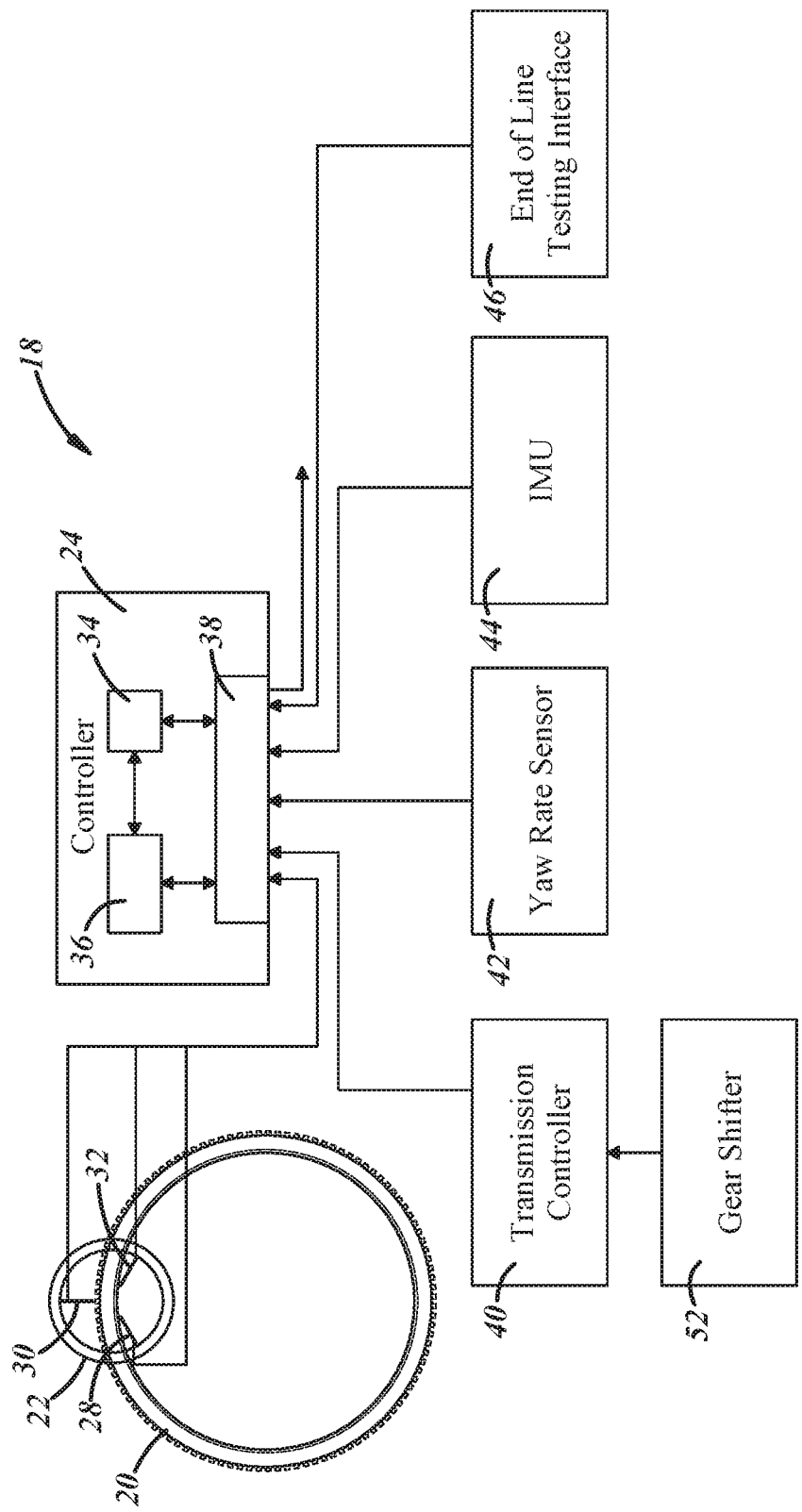
FIG. 2 is a diagrammatic view of a system for determining the speed and direction of rotation of a vehicle wheel in accordance with one embodiment of the present teachings.

Referring to FIG. 2, in accordance with the present teachings, a vehicle incorporating wheel assembly 10 may further include a system 18 for determining the speed and direction of rotation of the vehicle wheel. Information from system 18 may be used in a variety of vehicle systems including, but not limited to, the brake control system for brake 16 and stability control systems for the vehicle. Referring to FIGS. 1-2, system 18 may include a tone wheel 20, a wheel speed sensor 22, and a controller 24.

Tone wheel 20 (sometimes referred to as an "exciter ring" or "tone ring") is configured for rotation with the vehicle wheel and is fixed to wheel hub 14 for rotation with wheel hub 14 and the vehicle wheel. In some embodiments, tone wheel 20 may be formed within, or integrated with, a seal for the bearings supporting the vehicle wheel on wheel hub 14. In some embodiments, tone wheel 20 defines a plurality of radially outwardly extending ferromagnetic teeth and sensor 22 detects and reacts to the presence or absence of the teeth as tone wheel 20 rotates relative to sensor 22. In other embodiments, tone wheel 20 may comprise a magnetic encoder with a plurality of circumferentially arranged magnets of alternating polarity and sensor 22 detects and reacts to the magnets as tone wheel 20 rotates relative to sensor 22.

Figure 3:
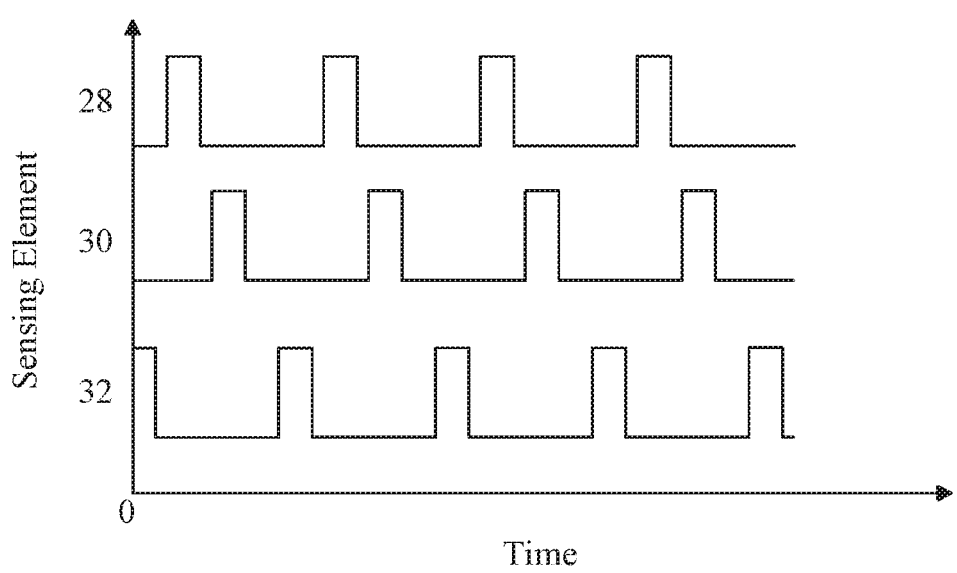
FIG. 3 is a timing diagram illustrating signals output by the sensor of the system of FIG. 2.

Sensor 22 generates signals indicative of the rotational speed and direction of tone wheel 20 and, therefore, the vehicle wheel, in response to rotation of tone wheel 20 relative to sensor 22. Referring to FIG. 1, sensor 22 may be inserted into an opening in a sensor mounting block 26 on axle 12 and thereby positioned relative to tone wheel 20 such that sensor 22 detects rotation of tone wheel 20 relative to sensor 22. In certain embodiments, sensor 22 may comprise a passive or variable reluctance wheel speed sensor having one or more coils wound about a permanent magnet. Rotation of the tone wheel 20 causes changes in the magnetic field generated by the permanent magnet and induces currents in the coils resulting in analog, sine-wave voltage signals in which the amplitude of the signals varies in response to the speed of rotation of tone wheel 20. In other embodiments, sensor 22 may comprise an active wheel speed sensor in which a current provided by an external power source is modulated as a result of changing magnetic resistance occurring in response to movement of tone wheel 20. The sensor 22 may, for example, comprise a Hall effect sensor or magneto-resistive sensor. A processing circuit generates a digital, square wave output signal responsive to the changing current in the circuit in which the frequency of the pulses in the signal varies in response to the speed of rotation of tone wheel 20. In accordance with one aspect of the present teachings, the inventive system 18 enables the use of active wheel speed sensors without the physical key that is often required to determine the direction of rotation. As a result, the passive and active wheel speed sensors can be mounted in the same mounting structure (e.g., mounting block 26). Referring to FIG. 2, sensor 22 includes a plurality of sensing elements 28, 30, 32. The sensing elements 28, 30, 32 are arranged in a pattern such that rotation of tone wheel 20 relative to sensor 22 causes sensing elements 28, 30, 32 to generate a plurality of phase-shifted output signals as illustrated in FIG. 3 (illustrating an embodiment where sensor 22 comprises an active wheel speed sensor). Referring again to FIG. 2, in the illustrated embodiment, sensor 22 includes three sensing elements 28, 30, 32 that are arranged in a circle equidistant from one another (i.e., such that a circumferential center of each sensing element 28, 30, 32 is spaced approximately one hundred and twenty (120) degrees apart from a circumferential center of each adjacent sensing element 28, 30, 32). It should be understood, however, that the number and arrangement of sensing elements 28, 30, 32 may vary. Sensor 22 may include additional signal processing circuitry to condition the outputs of sensing elements 28, 30, 32 including filters and analog to digital converters. Rotation of tone wheel 20 in one rotational direction will cause sensor 22 to generate one plurality of phase-shifted signals while rotation of tone wheel 20 in the opposite rotational direction will cause sensor 22 to generate a different plurality of phase-shifted signals.

Controller 24 is provided to determine the speed and direction of rotation of the vehicle wheel responsive to the signals generated by sensor 22 and other information/signals described in greater detail below. In some embodiments, controller 24 may comprise the controller for the vehicle's brake control system. Controller 24 may comprise a programmable microprocessor or microcontroller or may comprise an application specific integrated circuit (ASIC). In certain embodiments, controller 24 may include a memory 34 and a central processing unit (CPU) 36. Controller 28 may also include an input/output (I/O) interface 38 including a plurality of input/output pins or terminals through which the controller 24 may receive a plurality of input signals and transmit a plurality of output signals. The input signals may include signals received from sensor 22. In accordance with one aspect of the present teachings discussed in greater detail below, the input signals may also include signals from various sources other than sensor 22 that are indicative of the direction of rotation of the vehicle wheel including, for example, a transmission controller 40, a yaw rate sensor 42, an inertial measurement unit (IMU) 44, or an end of line testing interface 46. The output signals may include signals used for controlling various vehicle systems including braking and stability control. Where controller 24 forms a controller for the brake control system, for example, the output signals may include control signals for fluid control valves used to control a brake actuator for brake 16. The output signals may also include signals for the control of operator interfaces for the vehicle in order to provide information regarding vehicle speed and direction to the vehicle operator. Controller 24 may be configured to communicate with sensor 22, transmission controller 40, yaw rate sensor 42, IMU 44, and testing interface 46 over a conventional vehicle communication bus such as a controller area network (CAN) (or another communication medium such as power line communication (PLC), Local Interconnect Network (LIN) or others). In alternative embodiments, controller 24 may be configured to communicate wirelessly with one or more of sensor 22, transmission controller 40, yaw rate sensor 42, IMU 44, and testing interface 46 using various industry standard short-range wireless communication protocols such as Bluetooth, Wi-Fi (IEEE 802.11), or Zigbee.

Figure 4:
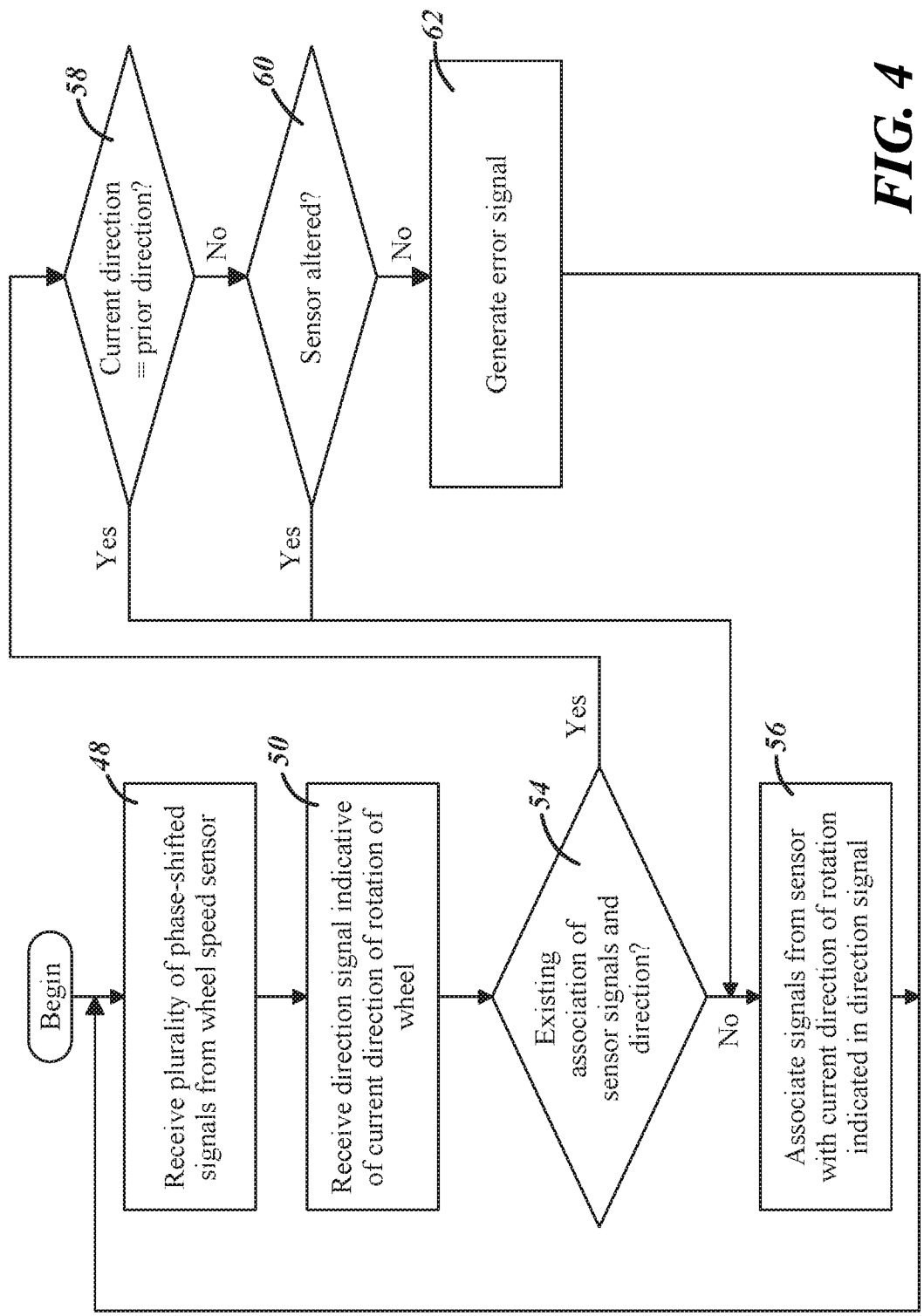
FIG. 4 is a flowchart illustrating one embodiment of a method for determining the speed and direction of rotation of a vehicle wheel in accordance with the present teachings.

Referring now to FIG. 4, controller 24 may be configured with appropriate programming instructions (i.e., software or a computer program) to implement a method for determining the speed and direction of rotation of a vehicle wheel. The method may begin with the step 48 receiving a plurality of phase-shifted signals generated by sensor 22 responsive to rotation of the vehicle wheel and tone wheel 20. The signals will vary depending on the direction of rotation of the vehicle wheel and tone wheel 20. Thus, controller 24 will receive one plurality of phase-shifted signals responsive to rotation of tone wheel 20 with the vehicle wheel in a first rotational direction and a different plurality of phase-shifted signals responsive to rotation of tone wheel 20 with the vehicle wheel in a second rotational direction. Using these signals, controller 24 can determine the speed of rotation of the vehicle wheel and output data signals indicative of the speed and/or control signals for various vehicle systems (e.g., control signals for fluid control valves in the vehicle braking system). In particular, controller 24 can determine speed responsive to the amplitude of the analog signal generated by a passive sensor or the pulse frequency of a digital signal generated by an active sensor.

Although controller 24 can determine the speed of the vehicle wheel responsive to the signals from sensor 24, controller 24 cannot necessarily determine the direction of rotation of the vehicle wheel in all cases. For example, the output of passive wheel speed sensors generally does not provide directional information while active speed sensors often rely on a physical key. In accordance with the present teachings, the method may therefore continue with the step 50 of receiving a direction signal indicative of a current direction of rotation of the vehicle wheel from a source other than sensor 22. This input allows the system to "learn" and interpret the signals being provided by sensor 22 so that future instances of the same or similar signals will provide information on the direction of rotation of the vehicle wheel in addition to the speed of rotation. The direction signal may be obtained from a variety of systems capable of providing information regarding the direction of movement of the vehicle wheel or the vehicle in general. Referring to FIG. 2, in one embodiment, the direction signal may be generated by transmission controller 40. In particular, transmission controller 40 may broadcast the position of a gear shifter 52 (sometimes referred to as a gear selector in automatic transmissions) moved by the vehicle operator to shift the vehicle between a forward and reverse movement to other vehicle systems on the vehicle communication bus thereby indicating the direction of rotation of the vehicle wheel. In another embodiment, the direction signal may be generated by a yaw rate sensor 42 on the vehicle. Conventional vehicles typically include a yaw rate sensor to measure the speed of rotation of the vehicle about its vertical axis for use in stability control. Information regarding the direction of travel of the vehicle and, therefore, the direction of rotation of the vehicle wheel, can be obtained from the signals generated by yaw rate sensor 42. In another embodiment, the direction signal may be generated by an inertial measurement unit (IMU) 44 on the vehicle. IMUs detect linear acceleration along, and the rate of rotation about, various vehicle axes. IMUs may be used in various vehicle systems including vehicle navigation systems. Information regarding the direction of travel of the vehicle and, therefore, the direction of rotation of the vehicle wheel, can be obtained from the signals generated by IMU 44. In yet another embodiment, the direction signal may be provided to controller 24 through an end of line testing interface 46. Following assembly of a vehicle and prior to sale of the vehicle, the vehicle will frequently undergo a variety of tests to evaluate the operation of the vehicle. As part of this end of line testing, the vehicle may be positioned on a vehicle test stand or rig with the vehicle wheel between two rollers configured to be driven about rotational axes by one or more motors under the control of a test stand controller. Information regarding the direction of rotation of the wheel is known during this test and can be input to controller 24 from the test stand controller or a user input from a user interface associated with the vehicle test stand through an end of line testing interface 46 between the vehicle and the vehicle test stand.

Referring again to FIG. 4, the method may continue with the step 54 of determining, whether the plurality of phase-shifted signals from sensor 22 has already been associated with a direction of rotation of the vehicle wheel. Once the system has "learned" that signals from sensor 22 having certain characteristics are associated with a particular direction of rotation of wheel, the system is able to interpret future signals having the same characteristics. Therefore, information regarding the direction of rotation from subsequent direction signals is not absolutely necessary to interpret future signals from sensor 22. The information may, however, be used to verify that that knowledge learned by the system remains accurate as described in greater detail below.

If the signals received from sensor 22 have not previously been associated with a direction of rotation of the vehicle wheel, the method may, in step 56, associate the signals from sensor 22 with the direction of rotation of the vehicle wheel indicated by the direction signal. Controller 24 may associate with signals and direction within a memory such as memory 34 or another memory where the information can be accessed by controller 24 (or other vehicle systems) to interpret future instances of signals generated by sensor 22. Controller 24 may implement and manage a conventional data structure such as a lookup table within memory 34 associating signals having certain characteristics from sensor 22 with a direction of rotation. In this manner, controller 24 is able to determine the speed and direction of rotation of the vehicle wheel responsive to signals generated by sensor 22 even in instances where the direction of rotation cannot be determined based on the signals from sensor 22 alone. As a result, system 18 is able to provide information on the direction of rotation for passive wheel speed sensors. System 18 can also provide information on the direction of rotation for active wheel speed sensors without the use of any physical key thereby facilitating use of the same mounting structure in the vehicle for both passive and active sensors. In situations where the mounting structure already includes or facilitates use of a physical key, system 18 can provide redundancy and a mechanism for verifying the directional information obtained through use of the key.

If the signals received from sensor 22 have previously been associated with a direction of rotation of the vehicle wheel, the method may continue with the step 58 of comparing the direction of rotation of the vehicle wheel indicated by the direction signal with the direction of rotation of the vehicle wheel stored in memory 34. Controller 24 may access memory 34 to receive the prior direction and determine whether the current direction indicated by the direction signal is identical to the prior direction stored in memory 34. If the current direction and prior direction are identical, the method may proceed to step 56.

If the current direction of rotation of the vehicle wheel indicated by the direction signal is not identical to the prior direction of rotation of the vehicle wheel associated with the signals in memory 34, the method may continue with the step 60 of determining whether a state of sensor 22 has been altered in some way between the time the prior direction of rotation of the vehicle wheel was stored in memory 34 and the time the current direction of rotation of the vehicle wheel was obtained. In this manner, controller 24 determines whether there is an explanation for the difference in the current and prior directions of rotation for the same or similar signals from sensor 22. Controller 24 may, for example, determine that the sensor 22 was removed after the prior direction of rotation was obtained and was either replaced with a new sensor 22 or reinserted following a maintenance action on the sensor 22 or another component or system of the vehicle. Controller 24 may determine that the state of sensor 22 has been altered by comparing signals currently generated by sensor 22 against previously signals generated by sensor 22. If the comparison meets a predetermined condition (e.g., if a characteristic of the two sets of signals differs by more than a predetermined threshold), controller 24 may determine that the state of sensor 22 has been altered. If controller 24 determines that the state of sensor 22 was altered in some way, the method may proceed again to step 56 in which the prior direction of rotation of the vehicle wheel is replaced with the current direction of rotation of the vehicle wheel in memory 34. Controller 24 may simply overwrite the location in memory 34 associating the signals from sensor 22 and the prior direction with the current direction indicated by the direction signal. If controller 24 determines that the state of sensor 22 has not been altered—and, therefore, there is no immediate explanation for the difference in the current direction of rotation indicated by the direction signal and the prior direction of rotation stored in memory 34—the method may continue with the step 62 of generating an error signal indicating that further investigation of other action is required. The error signal may be used to generate a warning to the vehicle operator through a user interface on the vehicle (e.g., an audio, visual or haptic warning through an interface in the cabin of the vehicle). The error signal may also be used by various vehicle systems in determining how to control components of the vehicle.

A system 18 and method for determining the speed and direction of rotation of a vehicle wheel in accordance with present teachings represents an improvement as compared to conventional systems and methods. In particular, the system 18 and method use information independent of the wheel speed sensors 22 to associate a direction of rotation with signals generated by the sensors 22. As a result, the system 18 and method enable a direction of rotation to be associated with signals generated by passive or active wheel speed sensors 22. In the case of passive sensors, the system 19 and method provide directional information where such information was not previously available. In the case of active sensors, the system 18 and method provide directional information without requiring a physical key, thereby allowing the use of the same mounting structure in vehicles for both passive and active sensors.

While the invention has been shown and described with reference to one or more particular embodiments thereof, it will be understood by those of skill in the art that various changes and modifications can be made without departing from the spirit and scope of the invention.

What is claimed is:

1. A system for determining the speed and direction of rotation of a wheel in a vehicle, comprising:
    a wheel speed sensor facing a tone wheel configured for rotation with the vehicle wheel, the wheel speed sensor configured to generate a first plurality of phase-shifted signals responsive to rotation of the tone wheel with the vehicle wheel in a first rotational direction and a second plurality of phase-shifted signals, different from the first plurality of phase-shifted signals, responsive to rotation of the tone wheel with the vehicle wheel in a second rotational direction; and,
    a controller configured to
        receive one of the first and second pluralities of phase-shifted signals from the wheel speed sensor;
        receive a direction signal indicative of a current direction of rotation of the vehicle wheel from a source other than the wheel speed sensor; and,
        associate the one of the first and second pluralities of phase-shifted signals with the current direction of rotation of the vehicle wheel indicated by the direction signal in a memory.

2. The system of claim 1 wherein the wheel speed sensor comprises a passive wheel speed sensor.

3. The system of claim 1 wherein the wheel speed sensor comprises an active wheel speed sensor.

4. The system of claim 1 wherein the direction signal is generated by a transmission controller responsive to a position of a gear shifter.

5. The system of claim 1 wherein the direction signal is generated by a yaw rate sensor on the vehicle.

6. The system of claim 1 wherein the direction signal is generated by an inertial measurement unit on the vehicle.

7. The system of claim 1 wherein the direction signal is received through an end of line testing interface between the vehicle and a vehicle test stand.

8. The system of claim 1 wherein the controller is further configured to:

determine, after receiving the one of the first and second pluralities of phase-shifted signals from the wheel speed sensor and prior to associating the one of the first and second pluralities of phase-shifted signals with the current direction of rotation of the vehicle wheel indicated by the direction signal in a memory, whether the one of the first and second pluralities of phase-shifted signals is associated with a prior direction of rotation of the vehicle wheel in the memory;

compare, if the one of the first and second pluralities of phase-shifted signals is associated with a prior direction of rotation of the vehicle wheel in the memory, the current direction of rotation of the vehicle wheel indicated by the direction signal with the prior direction of rotation of the vehicle wheel stored in the memory.

9. The system of claim 8 wherein the controller is further configured to determine, if the current direction of rotation of the vehicle wheel indicated by the direction signal and the prior direction of rotation of the vehicle wheel stored in the memory are not identical, whether a state of the wheel speed sensor was altered between the time the prior direction of rotation of the vehicle wheel was stored in the memory and the time the current direction of rotation of the vehicle wheel was obtained.

10. The system of claim 9 wherein the controller is further configured to generate, if the state of the wheel speed sensor was not altered between the time the prior direction of rotation of the vehicle wheel was stored in the memory and the time the current direction of rotation of the vehicle wheel was obtained, an error signal.

11. The system of claim 9 wherein the controller is further configured to replace, if the state of the wheel speed sensor was altered between the time the prior direction of rotation of the vehicle wheel was stored in the memory and the time the current direction of rotation of the vehicle wheel was obtained, the prior direction of rotation of the vehicle wheel with the current direction of rotation of the vehicle wheel in the memory.

12. A method for determining the speed and direction of rotation of a wheel in a vehicle, comprising:
receiving, from a wheel speed sensor facing a tone wheel configured for rotation with the vehicle wheel, one of a first plurality of phase-shifted signals generated by the wheel speed sensor responsive to rotation of the tone wheel with the vehicle wheel in a first rotational direction and a second plurality of phase-shifted signals, different from the first plurality of phase-shifted signals, generated by the wheel speed sensor responsive to rotation of the tone wheel with the vehicle wheel in a second rotational direction; and,
receiving a direction signal indicative of a current direction of rotation of the vehicle wheel from a source other than the wheel speed sensor; and,
associating the one of the first and second pluralities of phase-shifted signals with the current direction of rotation of the vehicle wheel indicated by the direction signal in a memory.

13. The method of claim 12 wherein the wheel speed sensor comprises a passive wheel speed sensor.

14. The method of claim 12 wherein the wheel speed sensor comprises an active wheel speed sensor.

15. The method of claim 12 wherein the direction signal is generated by a transmission controller responsive to a position of a gear shifter.

16. The method of claim 12 wherein the direction signal is generated by a yaw rate sensor on the vehicle.

17. The method of claim 12 wherein the direction signal is generated by an inertial measurement unit on the vehicle.

18. The method of claim 12 wherein the direction signal is received through an end of line testing interface between the vehicle and a vehicle test stand.

19. The method of claim 12, further comprising the steps of:
determining, after receiving the one of the first and second pluralities of phase-shifted signals from the wheel speed sensor and prior to associating the one of the first and second pluralities of phase-shifted signals with the current direction of rotation of the vehicle wheel indicated by the direction signal in a memory, whether the one of the first and second pluralities of phase-shifted signals is associated with a prior direction of rotation of the vehicle wheel in the memory;
comparing, if the one of the first and second pluralities of phase-shifted signals is associated with a prior direction of rotation of the vehicle wheel in the memory, the current direction of rotation of the vehicle wheel indicated by the direction signal with the prior direction of rotation of the vehicle wheel stored in the memory.

20. The method of claim 19, further comprising the step of determining, if the current direction of rotation of the vehicle wheel indicated by the direction signal and the prior direction of rotation of the vehicle wheel stored in the memory are not identical, whether a state of the wheel speed sensor was altered between the time the prior direction of rotation of the vehicle wheel was stored in the memory and the time the current direction of rotation of the vehicle wheel was obtained.

21. The method of claim 20 further comprising the step of generating, if the state of the wheel speed sensor was not altered between the time the prior direction of rotation of the vehicle wheel was stored in the memory and the time the current direction of rotation of the vehicle wheel was obtained, an error signal.

22. The method of claim 20, further comprising the step of replacing, if the state of the wheel speed sensor was altered between the time the prior direction of rotation of the vehicle wheel was stored in the memory and the time the current direction of rotation of the vehicle wheel was obtained, the prior direction of rotation of the vehicle wheel with the current direction of rotation of the vehicle wheel in the memory.

* * * * *